United States Patent [19]

Nekola

[11] Patent Number: 4,846,484

[45] Date of Patent: Jul. 11, 1989

[54] POP-UP DOLLY FOR A TOWING SYSTEM

[75] Inventor: Randy A. Nekola, Soddi, Tenn.

[73] Assignee: Century Wrecker Corporation, Ooltewah, Tenn.

[21] Appl. No.: 172,074

[22] Filed: Mar. 23, 1988

[51] Int. Cl.[4] .......................... B62D 63/00; B65G 7/00; B62B 3/02

[52] U.S. Cl. .................................... 280/43.11; 280/43; 414/426

[58] Field of Search .................... 280/43, 43.11, 43.21, 280/43.24, 43.17, 79.1 A, 641; 414/426, 427

[56] References Cited

U.S. PATENT DOCUMENTS

| | | | |
|---|---|---|---|
| 1,000,199 | 8/1911 | Sautter | 254/8 B |
| 1,134,211 | 4/1915 | McCalmont | 254/8 B |
| 1,171,049 | 2/1916 | Jeffery | 254/8 B |
| 1,196,690 | 8/1916 | Hofweber | 254/8 B |
| 2,554,365 | 5/1951 | Johnston, Jr. et al. | 254/8 B |
| 2,639,926 | 5/1953 | Parks | 280/47.15 |
| 2,801,864 | 8/1957 | Raney et al. | 280/800 |
| 2,856,195 | 10/1958 | Ziebarth | 280/43 |
| 2,915,318 | 12/1959 | Chesser | 280/43 |
| 2,922,534 | 1/1960 | Vodraska et al. | 280/43.17 |
| 2,943,863 | 7/1960 | Corey et al. | 280/79.1 R |
| 3,035,812 | 5/1962 | Wineteer | 254/2 R |
| 3,198,538 | 8/1965 | Nowell | 280/35 |
| 3,491,904 | 1/1970 | Fjeld | 414/560 |
| 3,521,771 | 7/1970 | Nowell et al. | 414/427 |
| 4,491,334 | 1/1985 | Tarbell | 280/47.12 |
| 4,664,399 | 5/1987 | Mobley et al. | 280/43.17 |

FOREIGN PATENT DOCUMENTS

| | | | |
|---|---|---|---|
| 1065735 | 9/1959 | Fed. Rep. of Germany | 280/43.17 |
| 1578137 | 8/1969 | France . | |

OTHER PUBLICATIONS

Brochure–Tolle Manufacturing–Pop-Up Do-ly PD 01–480, 570.
Brochure–Collins Manufacturing–SL Dolly.
Brochure–Holmes Self-Loading Dolly Model D–10, Pub. No. 86–384, Rev. 12/86.

*Primary Examiner*—Charles A. Marmor
*Assistant Examiner*—Tamara L. Finlay
*Attorney, Agent, or Firm*—Harness, Dickey & Pierce

[57] ABSTRACT

A wheel cradling assembly includes a self-locking and self-unlocking actuator assembly associated with each of four dolly wheels, each actuator assembly having a roll-over pivot gear for moving an associated dolly wheel spindle between released and actuated positions. A gear lock either allows or prohibits rotational motion of the roll-over pivot gear in accordance with the pivotable position of the gear lock, and a spindle retainer automatically engages and releasably locks the dolly wheel spindle whenever the spindle is moved to the actuated position by the gear. The dolly assembly also includes a pair of cross arm assemblies extending transversely between a pair of dolly wheel carrying base assemblies for surrounding a pair of coaxial wheels of a towed vehicle.

23 Claims, 5 Drawing Sheets

POP-UP DOLLY FOR A TOWING SYSTEM

BACKGROUND OF THE INVENTION

The invention relates generally to apparatus for use in wheel lift type towing systems. More specifically, the invention concerns a pop-up wheel-engaging dolly for elevating a coaxial pair of towed vehicle wheels.

Known dollys for raising a towed vehicle by a pair of coaxial wheels typically utilize a pair of dolly bases equipped with a dolly wheel at opposing ends which are placed at the outside lateral surface of the two tires to be lifted. Cross arm assemblies are then connected between the two dolly base members and means are provided at each wheel for raising the associated dolly wheel spindle to a towed position. In mechanical, manually actuatable arrangements, some prior systems typically use a ratchet gear mechanism for lifting and then a separate manually engagable master lock for holding the elevated dolly wheel spindle in the actuated position. Another type of manually actuatable system features simply a master lock mechanism without use of the ratchet type gear.

Also known in the art are hydraulically actuated self-loading dollys featuring relatively expensive and complicated hydraulic systems for use in raising and lowering the dolly wheel spindles.

Thus the hydraulic systems of the prior art are complicated, relatively expensive and require increased maintenance. The manually operated systems of the prior art require manual final locking in the actuated position.

There is a need for a relatively non-complex and economical pop-up dolly arrangement having wheel actuators providing for automatic dolly wheel spindle locking and release functions for respectively raising and lowering corners of the dolly cradling the wheels of a towed vehicle.

SUMMARY OF THE INVENTION

In a dolly assembly for raising and lowering a towed vehicle by engaging a coaxial pair of towed vehicle wheels, apparatus for raising and lowering a dolly wheel spindle between a released position and an actuated position includes a gear coupled to the dolly wheel spindle and mounted to the dolly assembly for rotation therewith, the gear means being operative on rotational movement to move the dolly wheel spindle between released and actuated positions. A gear engaging lock is coupled to the dolly assembly and operative in a first position to allow rotation of the gear and operative in a second position to prohibit rotation of the gear. Spindle retaining means coupled to the dolly assembly is operative to automatically, releasably engage and retain the dolly wheel spindle in the actuated position whenever the spindle is moved to the actuated position by the gear.

BRIEF DESCRIPTION OF THE DRAWINGS

The objects and features of the invention will become apparent from a reading of a detailed description of an illustrative embodiment taken in conjunction with the drawings, in which.

DETAILED DESCRIPTION

Figure 1:
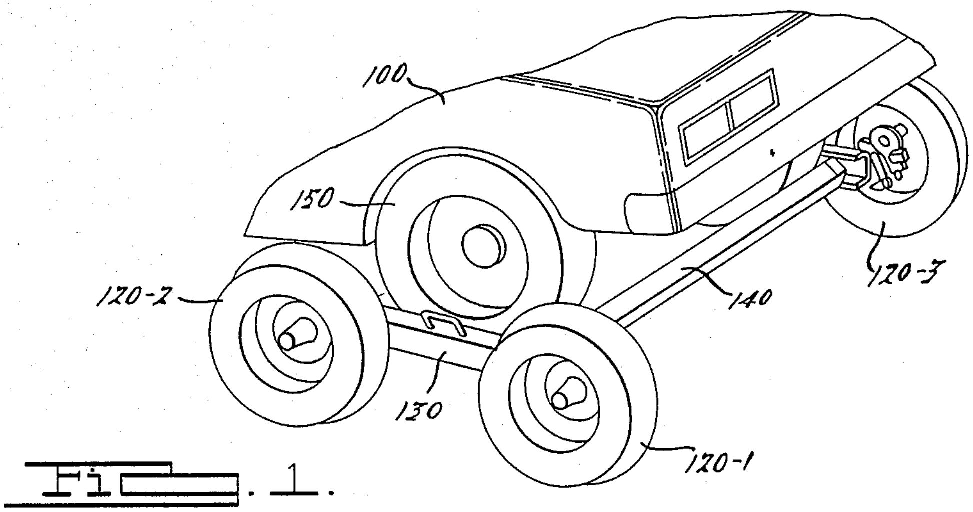
FIG. 1 is a perspective view showing a typical use of a pop-up dolly designed in accordance with the principles of the invention.

FIG. 1 depicts a dolly of the invention as it would be typically configured with respect to the front or rear coaxial wheels of a towed vehicle for cradling same in a wheel lift towing arrangement. As seen from FIG. 1, towed vehicle 100 has a pair of coaxial wheels such as at 150 engaged by a cradling dolly having four dolly wheels 120—1, 120—2, 120—3 and 120—4 (not shown in FIG. 1). Each dolly wheel is mounted to a dolly wheel spindle at opposite ends of dolly base assemblies such as at 130 which extend adjacent an outside surface of a towed wheel. The dolly base assemblies lying outwardly of each towed wheel are connected together at opposing points of the road engaging surface of the towed wheels via dolly cross-arm assemblies such as at 140. Another cross-arm assembly (not shown in FIG. 1) couples the dolly base assemblies at another end thereof such that a substantially rectangular dolly wheel cradle is formed for engaging the towed vehicle wheels 150.

Pop-up dolly assemblies of the general type depicted are typically actuated at each corner thereof, one dolly wheel spindle at a time to lift a towed vehicle by a pair of coaxial vehicle wheels for towing in a wheel-lift or other type towing system arrangement.

Figure 2:
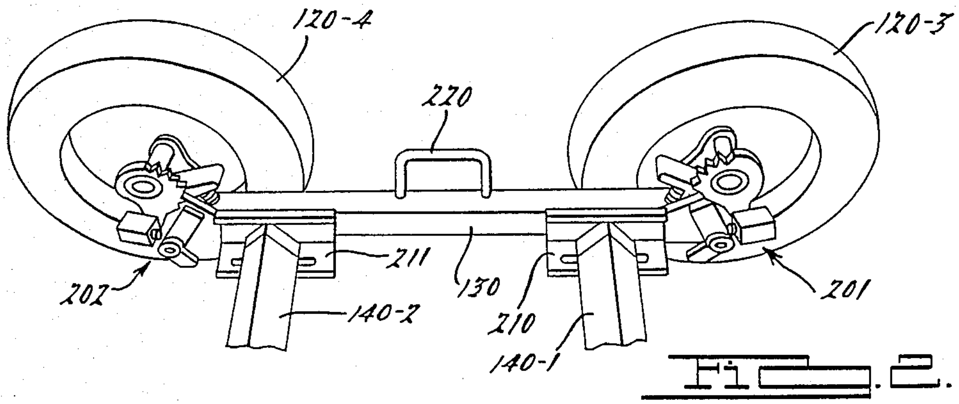
FIG. 2 is a perspective view taken from inside the dolly wheels of one side of the dolly apparatus in a deployed state.
Figure 3:
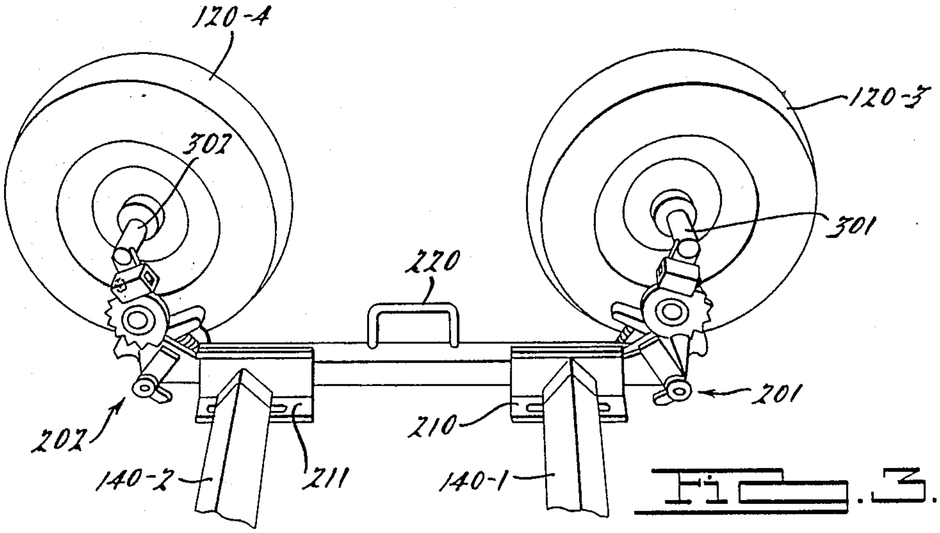
FIG. 3 is a perspective view taken from inside the dolly wheels of one side of the dolly apparatus in a non-deployed state.

The major components of the dolly wheel assembly of the invention may be seen from the perspective views of FIG. 2 and FIG. 3. FIG. 2 depicts a perspective view of one dolly base assembly 130 as viewed from inside the pair of dolly wheels 120—3 and 120—4 coupled to opposing ends of the dolly base assembly 130 via first and second dolly wheel actuator assemblies 201 and 202, respectively.

A dolly base carrying handle 220 is provide for ease of portability prior to assembling the dolly in a wheel cradling position.

First and second cross-arm assemblies 140—1 and 140—2 are retained at opposite ends of dolly base assembly 130 in the vicinity of actuators 201 and 202 by first and second cross-tube retainer channels 210 and 211, respectively. End attachment plates coupled to the cross-arm assemblies engage one of a plurality of apertures in the cross-tube retainer channels as will be explained in more detail in a later portion of this description. The wheel actuator assemblies 201 and 202 will likewise be described in further detail below with reference to FIGS. 4 through 8.

FIG. 3 sets forth a perspective view of the same apparatus seen in FIG. 2 but with the dolly wheels 120—3 and 120—4 in the released position wherein the dolly base assembly 130 and cross-arm assemblies 140—1 and 140—2 are in substantial contact with the supporting surface or road upon which the towed vehicle is presumed to rest. As seen from FIG. 3, dolly wheel spindles 301 and 302 have been rotated to a position above the dolly base assembly 130 relative to the positions of those wheel spindles in FIG. 2. In FIG. 2 the dolly wheels are shown in the actuated position wherein the dolly assembly frame comprised of two dolly base assemblies and two cross-arm assemblies is elevated above the support surface so as to lift the pair of coaxial towed vehicle wheels in a cradling type arrangement.

Figure 4:
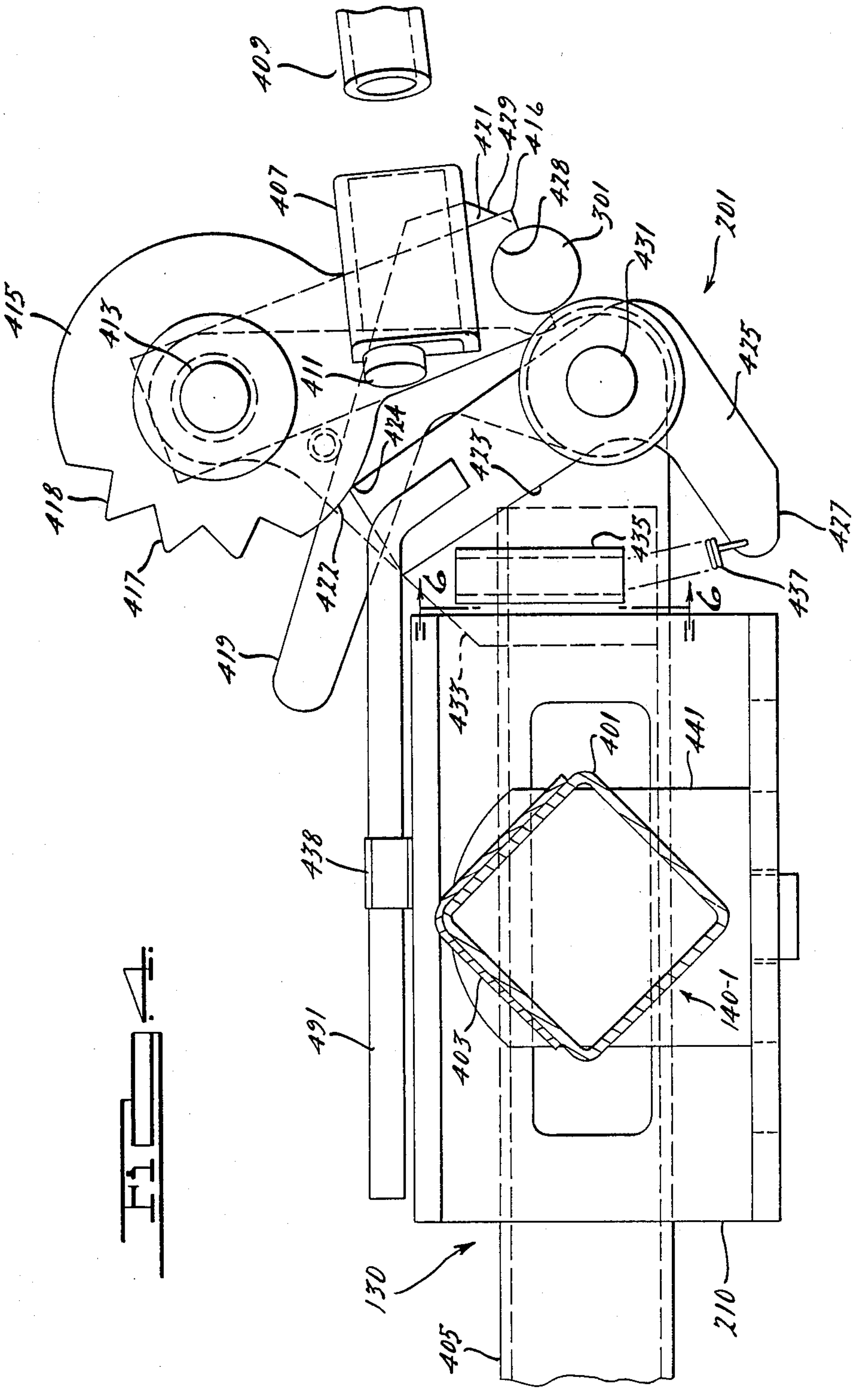
FIG. 4 is a side plan view of a dolly wheel actuator assembly for a first end of a pop-up dolly designed in accordance with the principles of the invention, with the dolly wheels or tires omitted.
Figure 5:
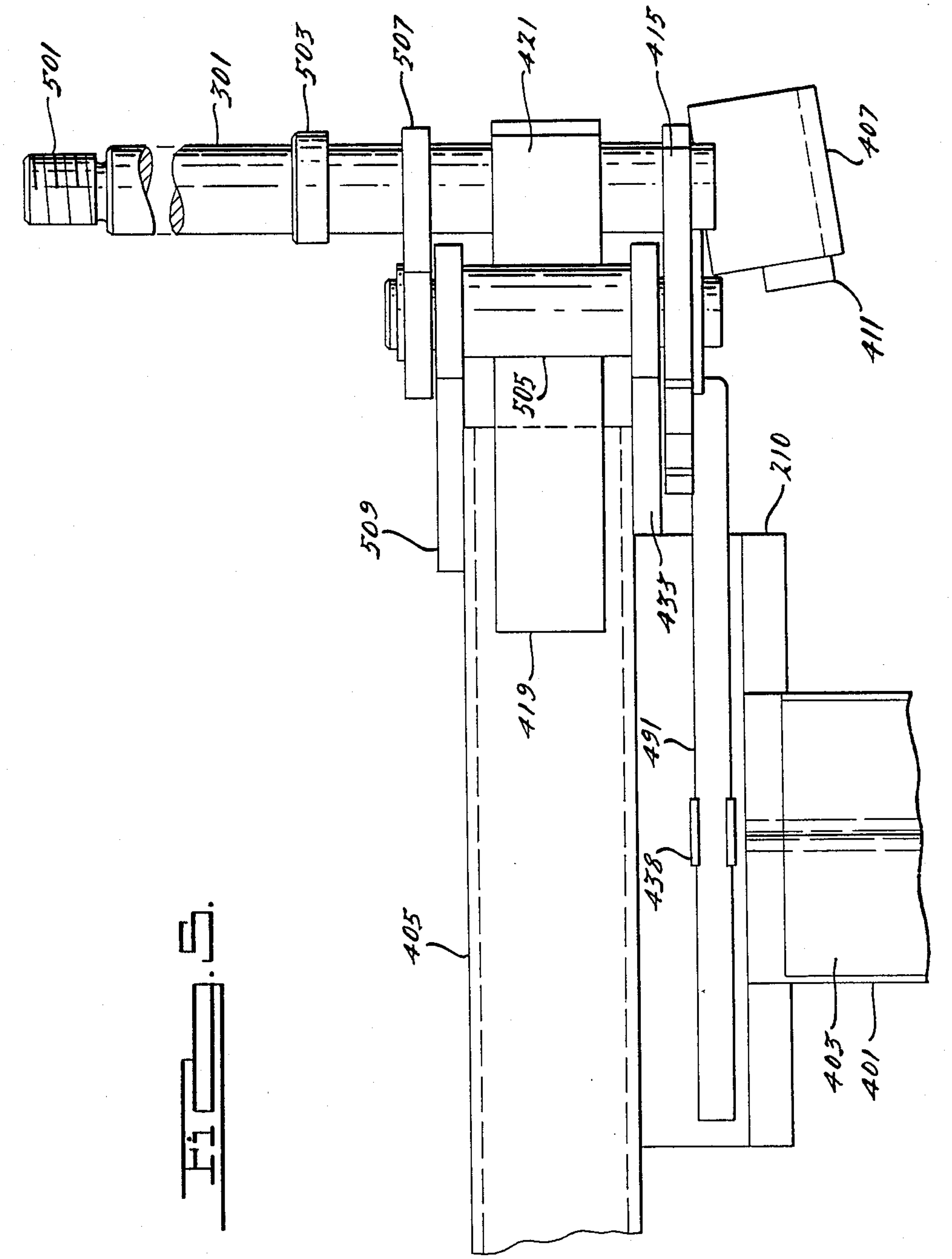
FIG. 5 is a top plan view of the apparatus depicted in FIG. 4.

FIGS. 4 and 5 set forth side and top views, respectively, of the dolly wheel assembly apparatus for dolly wheel 120—3 of FIG. 2 with the dolly wheel itself removed. As seen from FIGS. 4 and 5, dolly base assembly 130 includes a cross-tube retainer channel 210 coupled, typically by welding, to a dolly tube 405. Cross-tube retainer channel 210 receives a cross-tube attachment plate 441 which is coupled to an end of cross-tube 401. Cross-tube 401 has mounted to its upper two surfaces a cross-tube tread plate 403 for engaging the road contacting surface of a towed wheel. The cross-tube attachment plate 441, cross-tube 401 and cross-tube plate 403 comprise the cross-arm assembly 140—1 set forth in FIGS. 2 and 3.

Figure 6:
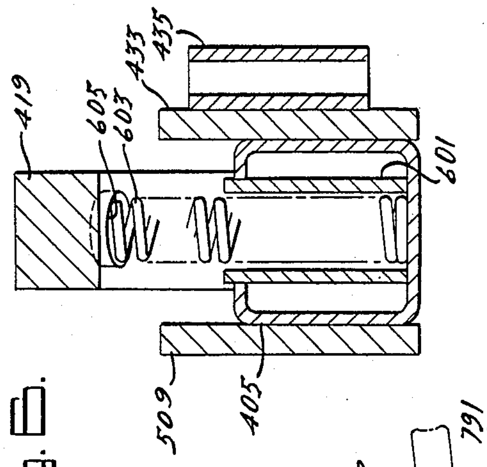
FIG. 6 is a partial cross-sectional view of the apparatus of FIG. 4 taken along line 6—6.

A first dolly wheel actuator assembly 201 associated with the dolly wheel spindle for dolly wheel 120—3 of FIGS. 2 and 3 is additionally set forth in more detail in FIGS. 4 and 5 and the partial sectional view in FIG. 6. With reference to FIGS. 4 and 5, dolly wheel spindle 301 (shown in the fully actuated or elevated dolly position in FIG. 4) is retained in the actuated position by an axle-capturing surface 428 of dolly wheel spindle retainer 421. Retainer 421 additionally includes a retainer camming surface 429 and a retainer handle portion 419. As will be explained in more detail later with reference to FIGS. 7 and 8, wheel spindle 301 in moving to the fully actuated position engages camming surface 429 in such a manner that it forces spring loaded retainer 421 into the locked position wherein spindle capturing surface 428 partially surrounds dolly wheel spindle 301.

Retainer 421 is spring biased to the locking position shown by means of a spring coupled between retainer handle 419 and dolly tube 405. This arrangement is shown in the partial cross-sectional view 6—6 of FIG. 6 wherein it is seen that dolly tube 405 includes a spring guard or retainer 601 for capturing one end of a biasing spring 603, the other end of which is captured in a spring receiving cavity 605 in retainer handle 419.

Retainer 421 is pivotally coupled to dolly base assembly 130 via a lower pivot shaft 431 which in turn is mounted between an inner pivot plate 433 and an outer pivot plate 509 (FIG. 5). Rigidly coupled to wheel spindle 301, such as by welding, are a roll-over pivot gear 415 and a roll-over pivot bar 507 (FIG. 5). Gear 415 is coupled to spindle 301 via a roll-over pivot gear arm 416. Gear 415 and pivot bar 507 are pivotably mounted to an upper pivot shaft 413 at opposite ends thereof. Shaft 413 is in turn coupled for rotation at opposite ends thereof with respect to inner pivot plate 433 and outer pivot plate 509. Upper pivot shaft 413 is carried in a bearing 505 (FIG. 5).

Roll-over pivot gear 415 includes a toothed portion having a plurality of gear teeth such as at 417 about an outer periphery of the rotating gear portion surrounding upper pivot shaft 413. Additionally, gear 415 includes a non-toothed bearing portion 422 which, in the fully actuated state shown in FIG. 4, abuts bearing portion 424 of gear lock 423. In the fully released position, gear notch 418 is engaged by bearing portion 424 of gear lock 423. The other gear teeth and associated notches shown define intermediate wheel spindle positions between the fully released state and the fully actuated state of the dolly wheel spindle.

Gear lock 423 is pivotably coupled to lower pivot shaft 431 and rotates between a first position preventing rotation of gear 415 wherein bearing portion 424 of gear lock 423 engages one of the gear teeth notches on the periphery of the roll-over gear 415 and a second position wherein bearing portion 424 bears against a non-toothed portion 422 of gear 415 (or temporarily the tips of the various gear teeth 417). Gear lock 423 is a substantially L-shaped member and includes a gear lock extension arm 425 terminating in a surface 427 which engages the support such that bearing portion 424 always is urged against a peripheral surface of gear 415, whether it be a notch, such as 418, or a non-toothed portion 422 of gear 415. This biasing is effected at another end to an end wall of spring guard 435 which is rigidly coupled, for example by welding, to inner pivot plate 433, as seen also in the partial cross-section view of FIG. 6.

Rigidly coupled to gear lock 423 at an end remote from gear lock extension arm 425 is a gear lock release handle 491. As seen in the fully actuated position of dolly wheel spindle 301 set forth in FIG. 4, gear lock release handle 491 is releasably retained by a self-locking and un-locking retainer clip 438 which is mounted to cross-tube retainer channel 210.

Roll-over pivot gear 415 is rotated from the fully released position to the fully actuated position shown in FIG. 4 by means of a lever bar 409 whose end is inserted into U-shaped reinforcement channel 407 which is rigidly coupled, for example by welding, to roll-over gear pivot arm 416. The lever bar 409 bears against a stop 411 located at one end of reinforcement channel 407.

As seen from FIG. 5, dolly wheel spindle 301 includes an inner wheel retaining spindle collar 503 and at its outermost end includes a threaded retainer-cap-receiving extension 501 for holding a dolly wheel tire on the spindle 301.

Figure 7:
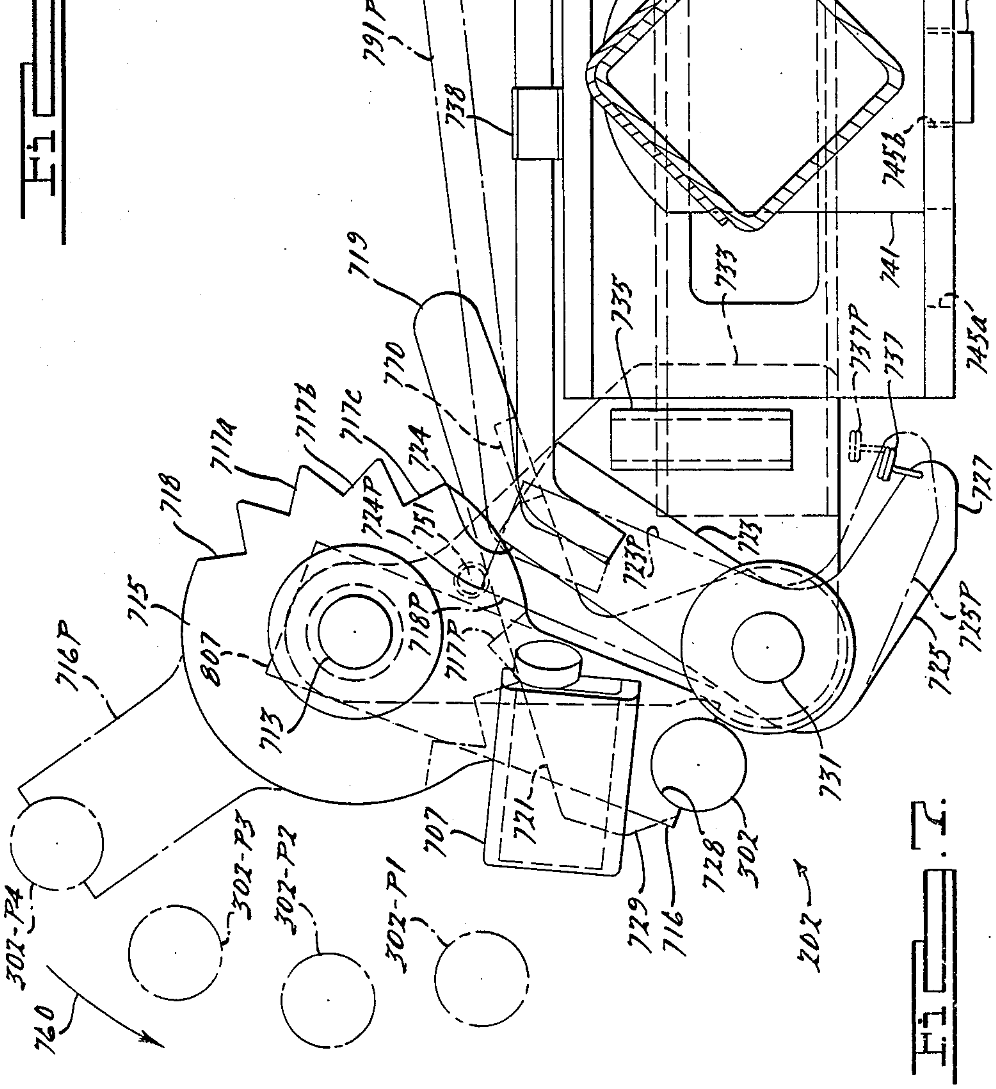
FIG. 7 is a side plan view of a dolly wheel actuator assembly for a second end of the pop-up dolly apparatus designed in accordance with the principles of the invention, with the dolly wheels or tires omitted.
Figure 8:
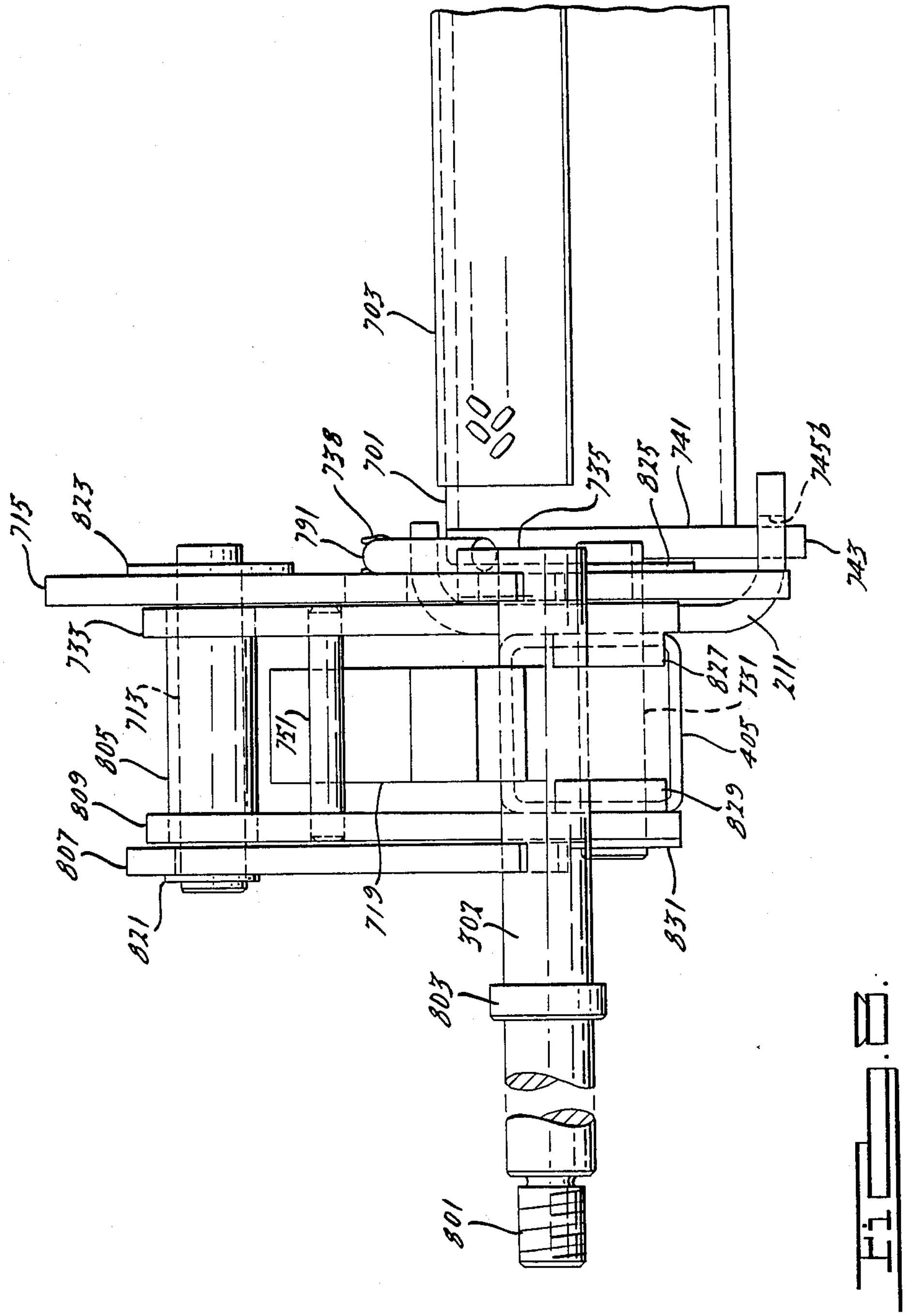
FIG. 8 is an end view of the apparatus set forth in FIG. 7.

Still further details of the dolly wheel spindle actuating assembly and the associated cross-arm assembly retention arrangement are shown in the views of FIG. 7 and FIG. 8 which respectively set forth side and end views of the actuator apparatus 202 associated with a dolly wheel 120—4 referenced above, but not specifically shown in FIGS. 2 and 3. In FIG. 8, reinforcement channel 707 of FIG. 7 has been deleted for a clearer showing of other apparatus.

In FIG. 7, the dolly wheel spindle actuator apparatus is shown in the solid line view in the fully actuated position of the dolly wheel spindle, as with the case for the actuator apparatus 201 depicted in FIG. 4. However, FIG. 7 additionally shows in phantom form a view of the dolly wheel spindle actuator apparatus in the fully released position. Additionally, intermediate positions of the dolly wheel spindle are also set forth in FIG. 7 in phantom line view.

In FIG. 7, all components having a counterpart in the view of FIG. 4 carry common last two digits of their numerical designators. The initial digit of the designator refers to the figure number. Hence, it will be seen that the roll-over pivot gear 415 of FIG. 4 has a corresponding counterpart 715 of FIG. 7. Similarly, retainer member 421 of FIG. 4 has a corresponding counterpart 721 in FIG. 7.

Dolly tube 405 at an end remote from that seen in FIG. 4 carries tube retainer channel 211 of FIGS. 2 and 3. As seen from FIG. 8, tube retainer channel 211 is substantially U-shaped in cross-section and comprises a substantially vertical wall joined by upper and lower substantially horizontal flanges. The lower horizontal flange includes a plurality of apertures 745*a*, 745*b*, 745*c*, any of which are shaped for mating receipt of a cross tube attachment plate tab 743 of cross tube attachment plate 741. Plate 741 is rigidly coupled to an end of cross tube 701, which carries on its upper surfaces a cross tube tread plate 703 for abutting engagement with the road engaging surface of a towed vehicle wheel.

With the arrangement shown, the cross arm assemblies 140—1 or 140—2 may be adjustably positioned in any of the apertures in the tube retainer channels 210 and 211 for accommodating cradling engagement by the cross arm assemblies with a variety of towed wheel sizes.

Additionally, with the arrangement shown for coupling the cross arm assemblies to the dolly base assemblies, it will be noted that when the cross tube attachment 741 engages one of the apertures 745 with plate tab 743, the end portion of the cross arm assembly will lie between the upper and lower substantially horizontal flange portions of tube retainer channel 211. This positioning assists in guarding against accidental dislodgement of the tab portion 743 from an aperture 745 in a vertical direction of motion of the cross tube 701 relative to the dolly tube 405.

Roll-over pivot gear 715 is shown in solid form in FIG. 7 in the fully actuated position with dolly wheel spindle 302 in its lowermost position relative to the dolly tube 405. In this fully actuated position retainer 721 releasably secures spindle 302 via spindle capturing surface 728. The retainer 721 is spring biased to this locked position by a biasing spring (not shown), one end of which is captured in spring receiving cavity 770 of retainer handle 719. The other end of the biasing spring is captured in a spring guard inside dolly tube 405 (which is not specifically shown in the views of FIG. 7 or FIG. 8).

Spindle 302 rides along camming surface 729 of retainer 721 on its way to the locked and fully actuated or raised position. Gear 715 is rotatably mounted about upper pivot shaft 713 along with a roll-over pivot bar 807, both bar 807 and spindle engaging extension arm 716 being rigidly coupled to dolly wheel spindle 302, for example by welding.

Gear 715 includes a plurality of gear teeth defining notches 718, 717*a*, 717*b*, and 717*c*. Non-toothed portion 722 of gear 715 is engaged by bearing portion 724 of pivotable gear lock 723 in the fully actuated position. In the fully released position, bearing portion 724 of gear lock 723 engages gear notch 718. In the intermediate positions between the fully released and actuated positions, bearing portion 724 will engage one of the gear tooth notches 717.

Gear lock 723 is pivotably coupled about a lower pivot shaft 731 and includes a gear lock extension arm 725 having a ground engaging surface 727 for effecting automatic release upon full lowering or releasing of the dolly assembly corner served by spindle actuating apparatus 202. As with gear lock 423 of assembly 201 of FIG. 4, gear lock 723 of FIG. 7 is biased such that it will always be urged against a peripheral surface of gear 715, whether it be a notched or un-notched portion of that peripheral surface. The biasing is effected via a latching spring 737. Additionally, in the released or intermediate positions wherein the gear lock 723 has its bearing portion 724 residing in one of the gear teeth notches, spring 737 will assume the phantom position 737P.

Roll-over pivot gear 715 is shown in the fully released position in phantom form wherein the spindle engaging extension arm 716 would be in its uppermost position as shown in the phantom view 716P. In this fully released position, the gear teeth would be located in the positions shown in phantom as 718P and 717P with notch 718P holding bearing portion 724P of gear lock 723P.

As with the dolly wheel spindle actuating apparatus 201 of FIG. 4, the roll-over pivot gear is set in motion through use of a lever bar (not shown) engaging a reinforcement channel 707.

As with the arrangement described with reference to FIGS. 4 and 5, upper pivot shaft 713 which rotatably carries roll-over gear 715 and roll-over pivot bar 807 is retained at its ends in inner pivot plate 733 and outer pivot plate 809 (FIG. 8) via a retaining ring 821 at one end and a flat washer 823 rigidly coupled to pivot shaft 713 at the other end. Bearing 805 surrounds pivot shaft 713.

Retainer handle 719 is coupled for rotation about lower pivot shaft 731 which is carried by inner pivot 733 and outer pivot plate 809 and by inner and outer bearings 827 and 829 respectively. Shaft 731 is retained in this position by a retaining ring 831 on one end and a flat washer 825 welded to the other end. Retainer 721 has its handle 719 urged against a roll pin 751 via the biasing spring (not shown in this view). Hence, roll pin 751 defines the uppermost pivotable position of retainer handle 719.

In operation, a lever bar is inserted into reinforcement channel 707, and starting at the fully released position of the roll-over gear extension handle 716P with the dolly wheel spindle shown in phantom at position 302-P4, the lever is rotated in the direction of arrow 760 to first intermediate position 302-P3 wherein the gear lock bearing portion 724 will engage gear notch 717*a*. Upon further rotative movement of the lever bar, dolly wheel spindle 302 will move to a second intermediate position shown at 302-P2 wherein bearing portion 724 of gear lock 723 will engage gear notch 717*b*. Still further movement in the counter clockwise direction 760 of the lever bar will move spindle 302 to position 302-P1 wherein bearing portion 724 of gear lock 723 will engage gear notch 717*c*. Notches 717*a*, *b* and *c* being engaged by bearing portion 724 of lock 723 in intermediate positions of gear 715 serves as a safety feature tending to prevent sudden fly-back of the lever bar during dolly wheel actuation, should the operator momentarily release the lever bar. Further rotation of the lever will then bring spindle 302 downwardly into contact with camming surface 729 of retainer 721 which will urge the retainer upwardly against the force of the retainer biasing spring until spindle capturing surface 728 snaps into place around spindle 302 and automatically assumes a locked or fully actuated position.

In the fully actuated position with the gear lock 723 in its downward most pivotal condition, lock release handle 791 will be automatically retained by retainer clip 738. Hence, during the release process, lock release handle 791 will be maintained in the locked state keeping bearing portion 724 out of any gear teeth recesses as the gear rotates toward the fully released position. Upon nearing the ground or support surface, surface 727 of gear lock extension arm 725 will strike the surface forcing gear lock 723 in a counter clockwise motion about lower pivot shaft 731 thereby automatically releasing handle 791 from retainer clip 738, in turn enabling bearing portion 724 to engage gear notch 718 in the fully released state.

During actuation of the dolly wheel spindle from the fully released to the fully actuated position, as bearing portion 724 goes in and out of the various gear teeth during rotation of gear 715, lock release handle 791 will alternate between the two positions shown in FIG. 7 but will not be fully forced down into the retainer clip 738 until the fully actuated position is reached since the peaks between the gear teeth notches are not long enough to fully jam handle 791 into the retainer clip 738.

The actuating apparatus of the invention therefore has clearly defined release and actuated positions and minimizes the probability of the operator unintentionally leaving the apparatus in a partially actuated state wherein a gear notch would be carrying the load of the vehicle via bearing portion 724 engaging one of the notches.

The automatic locking and releasing features of the apparatus eliminate the need for the operator to manually grasp locking and releasing apparatus in the vicinity of the actuators and requires only the use of an elongate lever bar for actuating the dolly wheel spindle via reinforcement channel 707 or for striking retainer handle 719 to initiate the releasing process. To initiate release, the operator merely strikes the upper surface of handle 719 (or 419 of FIG. 4) with the lever bar so as to force spindle engaging portion 728 (or 428 of FIG. 4) out of engagement with its corresponding dolly wheel spindle by causing an upward movement of surface 728 (or 428 of FIG. 4) by the resulting downward movement of handle 719 (or 419 of FIG. 4).

The invention has been described with reference to the details of an illustrative embodiment. Such details are to be taken for the sake of example only. The scope and spirit of the invention is to be interpreted in accordance with the appended claims.

What is claimed is:

1. In a dolly assembly for raising and lowering a towed vehicle by engaging a coaxial pair of towed vehicle wheels, apparatus for raising and lowering a dolly wheel spindle between a released position and an actuated position, the apparatus comprising:

gear means coupled to the dolly wheel spindle and mounted to the dolly assembly for rotation therewith, operative on rotational movement to move the dolly wheel spindle between released and actuated positions;

gear engaging means coupled to the dolly assembly and operative in a first position to allow rotation of the gear means and operative in a second position to prohibit rotation of the gear means; and retaining means coupled to the dolly assembly and operative to automatically releasably engage and retain the dolly wheel spindle in the actuated position whenever the spindle is moved to the actuated position by the gear means.

2. The apparatus of claim 1 further comprising self-locking means for maintaining the gear engaging means in the first position whenever the dolly wheel spindle attains the actuated position.

3. The apparatus of claim 1 further comprising self-unlocking means for enabling the gear engaging means to assume the second position whenever the dolly wheel spindle attains the released position.

4. The apparatus of claim 1 wherein the gear means includes a toothed surface having a plurality of recesses, and wherein the gear engaging means includes a bearing portion shaped for receipt in any one of the plurality of recesses to effect prohibition of rotation of the gear means.

5. The apparatus of claim 4 wherein the gear means further includes a non-toothed surface against which the bearing portion of the gear engaging means rests when the dolly wheel spindle is in the actuated position.

6. The apparatus of claim 1 wherein the gear means further comprises socket means for receipt of a lever for manually rotating the gear means.

7. In a dolly assembly for raising and lowering a towed vehicle by engaging a coaxial pair of towed vehicle wheels, apparatus for raising and lowering a dolly wheel spindle between a released position and an actuated position, the apparatus comprising:

a rotatable gear coupled to the dolly assembly and having a toothed portion including a plurality of recesses and a portion rigidly coupled to the dolly wheel spindle, the gear operative upon rotation thereof to move the dolly wheel spindle between a released position and an actuated position via a plurality of intermediate position each defined by one of the plurality of recesses;

a gear lock pivotably coupled to the dolly assembly and having a gear bearing portion shaped for mating receipt by any of the plurality of recesses, the gear lock operative in a first pivotable position to allow rotation of the gear and operative in a second pivotable position to prohibit gear rotation by engaging one of the recesses with the gear bearing portion; and a retainer coupled to the dolly assembly and having a retaining surface shaped for retaining engagement of a portion of a dolly wheel spindle surface, the retainer operative to automatically and to releasably lock the spindle in the actuated position whenever the spindle is moved to the actuated position by gear rotation.

8. The apparatus of claim 7 wherein the gear portion rigidly coupled to the dolly wheel spindle comprises an arm member extending outwardly of the toothed portion such that the dolly wheel spindle moves in an arcuate path as the gear is rotated;

wherein the retainer further comprises a camming surface; and wherein the arcuate path intersects the camming surface in such a way as to automatically engage the dolly wheel spindle with the retaining surface as the gear moves the spindle into the actuated position.

9. The apparatus of claim 7 wherein the retainer further comprises biasing means for urging the retainer toward a locked position wherein the dolly wheel spindle may be releasably locked in the actuated position.

10. The apparatus of claim 9 wherein the biasing means comprises a spring coupled between the retainer and the dolly assembly.

11. The apparatus of claim 7 further comprising retainer clip means coupled to the dolly assembly and wherein the gear lock further comprises a first gear lock extension member shaped for automatic retaining receipt in the retainer clip means whenever the gear lock remains in the first pivotable position.

12. The apparatus of claim 11 wherein the gear lock further comprises a second gear lock extension member positioned such that the second extension member will engage a dolly assembly supporting surface whenever the gear moves the dolly wheel spindle to the released position, engagement by the second extension member with the supporting surface causing automatic removal of the first gear lock extension member from the retainer clip means.

13. The apparatus of claim 12 wherein the gear lock further comprises biasing means coupled to the dolly assembly for urging the gear lock toward the second pivotable position.

14. The apparatus of claim 13 wherein the biasing means comprises a spring coupled between the second gear lock extension member and the dolly assembly.

15. The apparatus of claim 7 wherein the rotatable gear further comprises socket means for receipt of a lever for manually rotating the gear means.

16. A dolly assembly for raising and lowering a towed vehicle with respect to a supporting surface comprising:

first and second base assemblies each having actuating means at opposite ends for coupling each base assembly to a pair of dolly wheel carrying spindles and each having attachment means adjacent each actuating means, the first and second base assemblies respectively positional adjacent first and second coaxial wheels of the towed vehicle; and first and second cross arm assemblies extending between opposite ends of the first and second base assemblies and including means for engaging the attachment means on the first and second base assemblies such that the first and second cross arm assemblies will engage a road contacting surface of the coaxial wheels of the towed vehicle, the dolly assembly thus forming a substantially rectangular wheel cradle with a dolly wheel positioned at each corner thereof;

wherein each actuating means includes a rotatable gear coupled to a respective base assembly and having a toothed portion including a plurality of recesses and a portion rigidly coupled to the dolly wheel spindle, the gear operative upon rotation thereof to move the dolly wheel spindle between a released position, wherein an end of a cross arm assembly adjacent the actuating means contacts the supporting surface, and an actuated position, wherein the end of the cross arm assembly is elevated above the supporting surface via a plurality of intermediate positions, each defined by one of the plurality of recesses;

a gear lock pivotally coupled to the respective base assembly and having a gear bearing portion shaped for mating receipt by any one of the plurality of recesses, the gear lock operative in a first pivotable position to allow rotation of the gear and operative in a second pivotable position to prohibit gear rotation by engaging one of the plurality of recesses with the gear bearing portion; and a retainer coupled to the respective base assembly and having a retaining surface shaped for retaining engagement of a portion of a dolly wheel spindle surface, the retainer operative to automatically capture the dolly wheel spindle and to releasably lock the spindle in the actuated position whenever the spindle is moved to the actuated position by gear rotation.

17. The dolly assembly of claim 16 wherein the gear portion rigidly coupled to the dolly wheel spindle comprises an arm member extending outwardly from the toothed portion such that the dolly wheel spindle moves in an arcuate path as the gear is rotated;

wherein the retainer further comprises a camming surface adjacent to the retaining surface; and wherein the arcuate path intersects the camming surface in such a way as to automatically engage the dolly wheel spindle with the retaining surface as the gear moves the spindle into the actuated position.

18. The dolly assembly of claim 17 wherein the retainer further comprises a first spring coupled between the retainer and the respective base assembly for urging the retainer toward a locked position wherein the dolly wheel spindle may be releasably locked in the actuated position.

19. The dolly assembly of claim 18 further comprising a substantially U-shaped retainer clip coupled to the respective base assembly and wherein the gear lock further comprises a first gear lock extension member shaped for automatic retaining receipt in the retainer clip whenever the gear lock remains in the first pivotable position.

20. The dolly assembly of claim 19 wherein the gear lock further comprises a second extension member positioned such that the second extension member will engage the supporting surface whenever the gear moves the dolly wheel spindle to the released position, engagement by the second extension member with the supporting surface causing automatic removal of the first gear lock extension member from the retainer clip.

21. The dolly assembly of claim 20 wherein the gear lock further comprises a second spring coupled between the second gear lock extension member and the respective base assembly for urging the gear lock toward the second pivotable position.

22. The dolly assembly of claim 21 wherein the rotatable gear further comprises socket means for receipt of a lever for manually rotating the gear.

23. The dolly assembly of claim 16 wherein each attachment means comprises a cross arm assembly retainer channel having a substantially vertical wall portion coupled to upper and lower substantially horizontal flange portions, the lower flange portion having a plurality of apertures therethrough; and wherein each means for engaging the attachment means comprises an attachment plate coupled to an end of a respective cross arm assembly, the attachment plate including a tabbed portion shaped for receipt in any one of the plurality of retainer channel apertures, the attachment plate lying between the upper and lower retainer channel flanges when the tabbed portion is engaging one of the apertures.

* * * * *

UNITED STATES PATENT AND TRADEMARK OFFICE
CERTIFICATE OF CORRECTION

PATENT NO. : 4,846,484

DATED : July 11, 1989

INVENTOR(S) : Randy A. Nekola

It is certified that error appears in the above-identified patent and that said Letters Patent is hereby corrected as shown below:

Title page:

Other Publications:
Brochure-Tolle "Do-ly" should be --Dolly--.

Line 7, Abstract:
after "the" 2nd occurrence insert --gear lock's--

Line 8, Abstract:
after "position" delete --of the gear lock--.

Column 1, line 19, after "ratchet" insert --type--.

Column 3, line 28, after "cross-tube" insert --tread--.

UNITED STATES PATENT AND TRADEMARK OFFICE
CERTIFICATE OF CORRECTION

PATENT NO. : 4,846,484

DATED : July 11, 1989

INVENTOR(S) : Randy A. Nekola

It is certified that error appears in the above-identified patent and that said Letters Patent is hereby corrected as shown below:

Column 4, lines 21-24 "such that bearing portion 424 always is urged against a peripheral surface of gear 415, whether it be a notch, such as 418, or a non-toothed portion 422 of gear 415. This biasing is effected"

should be replaced with:

--surface or ground upon dolly wheel release. Gear lock 423 is biased such that bearing portion 424 always is urged against a peripheral surface of gear 415, whether it be a notch, such as 418, or a non-toothed portion 422 of gear 415. This biasing is effected via a latching spring 437 which is coupled at one end to gear lock extension arm 425 and--

Column 8, line 33, "position" should be --positions--.

Signed and Sealed this

Twelfth Day of June, 1990

*Attest:*

HARRY F. MANBECK, JR.

*Attesting Officer* *Commissioner of Patents and Trademarks*